United States Patent [19]

Benjamin et al.

[11] 4,284,261

[45] Aug. 18, 1981

[54] STROKE ADJUSTMENT FOR VACUUM MOTOR

[75] Inventors: Benjamin C. Benjamin, Flint; Charles A. Detweiler, Durand, both of Mich.

[73] Assignee: Schmelzer Corporation, Flint, Mich.

[21] Appl. No.: 59,997

[22] Filed: Jul. 23, 1979

[51] Int. Cl.[3] ........................ F16K 31/126; F15B 15/24

[52] U.S. Cl. ................................ 251/60; 137/DIG. 8; 92/13.1; 92/13.2; 92/13.4; 92/13.6

[58] Field of Search .................... 251/60; 137/DIG. 8; 92/13.1, 13.6, 13.2, 13.4

[56] References Cited

U.S. PATENT DOCUMENTS

| | | | |
|---|---|---|---|
| 3,733,972 | 5/1973 | Campbell | 251/60 X |
| 3,965,223 | 6/1976 | Benjamin et al. | 92/13.6 X |
| 4,056,043 | 11/1977 | Sriramamurty et al. | 92/13.6 X |

*Primary Examiner*—Arnold Rosenthal

*Attorney, Agent, or Firm*—Fisher, Gerhardt, Crampton & Groh

[57] ABSTRACT

A vacuum motor for controlling a carburetor choke valve in which the stroke of the motor is limited to a predetermined length for a predetermined period of time after which the length of stroke is increased a predetermined amount.

9 Claims, 3 Drawing Figures

STROKE ADJUSTMENT FOR VACUUM MOTOR

This invention relates to vacuum break devices or reciprocating vacuum motors for controlling carburetors on internal combustion engines, and more particularly to such devices in which the length of stroke can be controlled.

In the manufacture of automotive vehicles with internal combustion engines the carburetors are provided with vacuum motors to move the choke valve to an open position upon starting of the engine. Frequently such motors are provided with an adjusting arrangement by which the length and stroke of the motor and therefore the optimum choke opening of the carburetor can be set, usually when the engine is finally adjusted upon completion of manufacture of the vehicle. It has been found, however, that the optimum choke requirements change over the life of the vehicle and adjustment usually is required after some predetermined number of engine hours or vehicle miles. Usually such an adjustment requires an increase in the stroke of the vacuum motor device so that the carburetor choke valve is moved an additional few degrees of arc toward a more open position to change the air fuel ratio to a leaner mixture. It is desirable that such an adjustment occur automatically and also that the adjustment be of some predetermined amount to avoid error such as those that might occur by making manual adjustments and which could result in excessive exhaust emissions.

The devices to accomplish such an adjustment must operate to achieve their purpose only once, but it is desirable that the arrangement can be operated to test its condition and also so that relatively movable parts are cycled frequently to insure that they do not freeze together and prevent operation at the time that they are needed. Also, it is desirable that the usual adjusting function can be achieved at any time during the operation of the vehicle without interfering with the automatic adjusting device.

With this in mind it is an object of the invention to provide a vacuum motor device for controlling carburetors of internal combustion engines in which the length of stroke of the motor can be automatically varied after a predetermined period of time.

Another object of the invention is to provide such a vacuum control motor wherein relatively movable parts required to carry out the function of the automatic adjustment are moved relative to each other frequently during the course of operation of the vehicle so that they are freely movable relative to each other at the time that their automatic adjustment is required.

Still another object of the invention is to provide an automatic adjusting feature which coacts with a manually adjusted device permitting adjustment of a more conventional nature.

These and other objects of the invention will be apparent from the following description and from the drawings in which.

Figure 1:
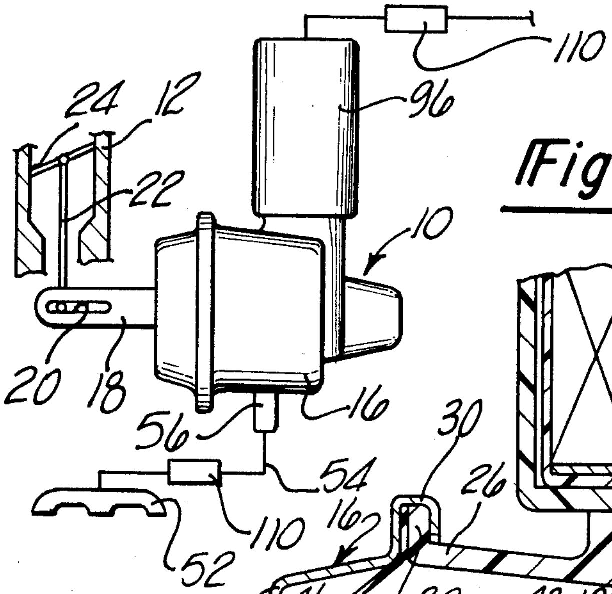
FIG. 1 is a diagrammatic view of a vacuum motor embodying the automatic adjustment of the present invention shown in association with the carburetor and engine intake manifold of an internal combustion engine.

Referring to the drawings the vacuum break device or fluid pressure motor embodying the invention as designated generally at 10 and as adapted to be supported on a carburetor 12 of an internal combustion engine. The vacuum motor 10 includes a housing 16 from which a reciprocating plunger assembly 18 projects. The plunger assembly 18 includes a slot 20 adapted to receive a control link 22 for moving a choke valve 24 from its normally closed position to an open position.

The housing 16 of the vacuum motor 10 includes a body member 26 and a cover member 28. Preferably the body member 26 is made of plastic material, and the cover member 28 is stamped of metal. The body member 26 and cover member 28 are joined together by deforming the flange 30 of cover 28 over a flange 32 of the body member 26.

Disposed within the housing 16 is a diaphragm assembly 34 including a diaphragm 36 made of elastomeric material and having its peripheral flange 38 clamped between the flanges 30 and 32. The diaphragm assembly 34 includes a pair of backing plates 40 and 42 disposed at opposite sides of the diaphragm and held together in fixed relationship by a rivet projection 44 at one end of plunger 18. The diaphragm assembly 34 divides the housing 16 into chambers 46 and 48. The chamber 46 is maintained at an atmospheric pressure by way of the opening 50 in the cover member 28 through which the plunger 18 extends. The chamber 48 is maintained in constant communication with the intake manifold 52 of the internal combustion engine by way of a line 54 connected to an inlet port 56 open to the interior of the housing 16 and in particular with the vacuum chamber 48. When the internal combustion engine is operating, vacuum pressure is available in the chamber 48 and when the engine is stopped, atmospheric pressure is reestablished in the chamber 48. The chamber 48 can therefore be considered a variable pressure chamber and the chamber 46 which is maintained at atmospheric pressure a constant pressure chamber.

The mechanism by which the length of stroke of the plunger 18 is controlled includes a stop means in the form of an adjusting screw 58 which is adjustable axially of the housing 16 a stroke modifying means provided by and a shuttle mechanism 60 which is movable transversely of the adjusting screw 58. The adjusting screw 58 has a head 62 disposed at the exterior of the housing 16 in a cavity 64. Rotation of the head 62 causes the adjusting screw to move longitudinally to a predetermined position and, under certain operating conditions, the end 66 of the screw engages a plate 68 held in fixed relationship to the diaphragm assembly 34 to limit its movement within the housing 16.

The shuttle mechanism 60 includes a body member 70 disposed between a wall 72 of the body member 26 and an annular ring 74 held in spaced relationship to the wall 72. The ring 74 also acts as a seat for a spring 76 biasing the diaphragm assembly 34 into engagement with the interior of the cover member 28 as seen in FIG. 2.

The body member 70 is provided with a large elongated opening 77 which receives the adjusting screw 58 and permits the body member to be moved transversely of the screw. The body member 70 also is provided with a plurality of fingers 78 which project through a large opening 80 formed by the ring 74. The ends of the fingers 78 are provided with hook elements 82 engagable with a flange 84 of a cap 86. The flange 84 is biased into engagement with the hook elements 82 by a spring 88 acting between a wall 90 of the cap 86 and a recess 92 in the body 70.

Figure 2:
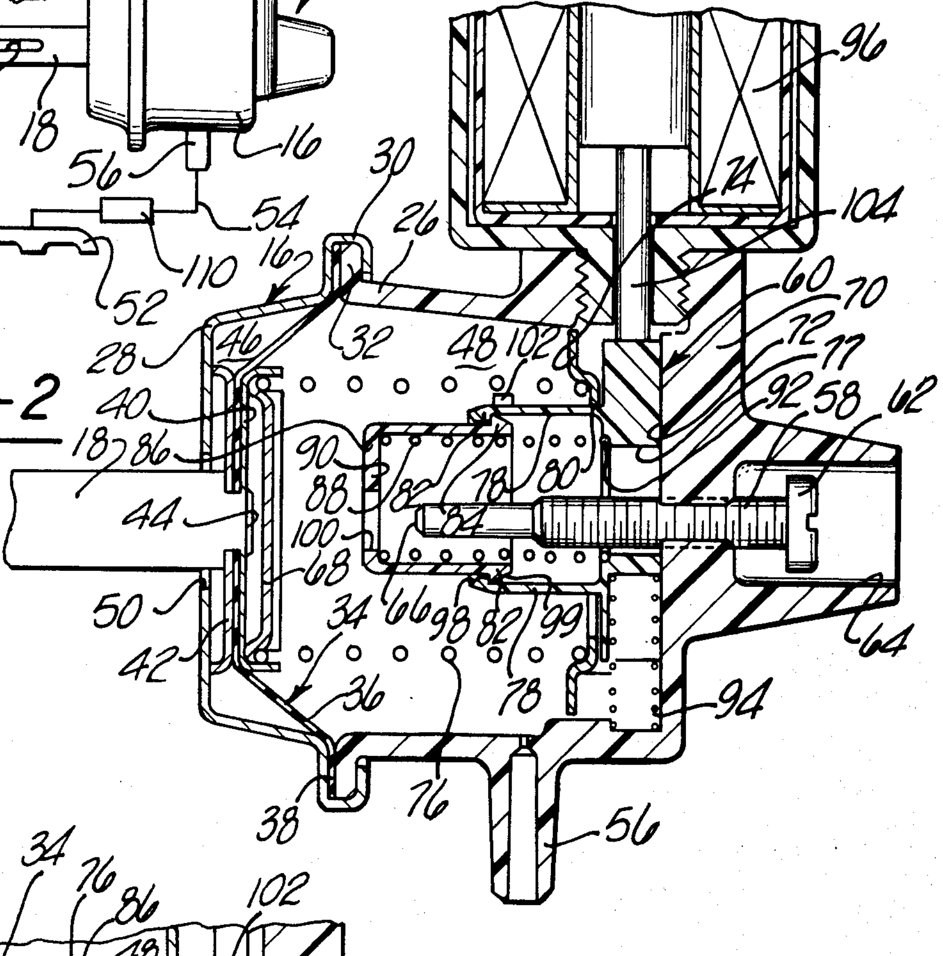
FIG. 2 is a cross-sectional view at an enlarged scale of the vacuum motor seen in FIG. 1 illustrating one condition of operation.

The body 70 is normally biased to the position seen in FIG. 2 by a transverse spring 94. The shuttle mechanism 60 is movable from the position indicated in FIG. 2 to the position in FIG. 3 by a solenoid 96. In the energized condition of the solenoid 96, the shuttle mechanism 60 is in the FIG. 3 position and in the deenergized condition the shuttle mechanism occupies the position illustrated in FIG. 2.

The body member 70 and the cap 86 of the shuttle mechanism 60 preferably are made of plastic material and the fingers 78 are sufficiently flexible so that the body 70 and cap 86 can be assembled by pressing the flange 84 against the hook elements 82. Complementary cam surfaces 98 and 99 on the flange 84 and the hook elements 82, respectively, act to deflect the fingers 78 radially outwardly sufficiently to permit positioning of the flange 84. The cap 86 is provided with an eccentric opening 100 which in the position illustrated in FIG. 2 is maintained axially of the housing 16 and in alignment with the adjusting screw 58 by means of a stop 102 on cap 86 disposed between adjacent fingers 78. The stops 102 serve to prevent rotation of the cap 86 and orient it properly during movement of the shuttle mechanism 60.

Figure 3:
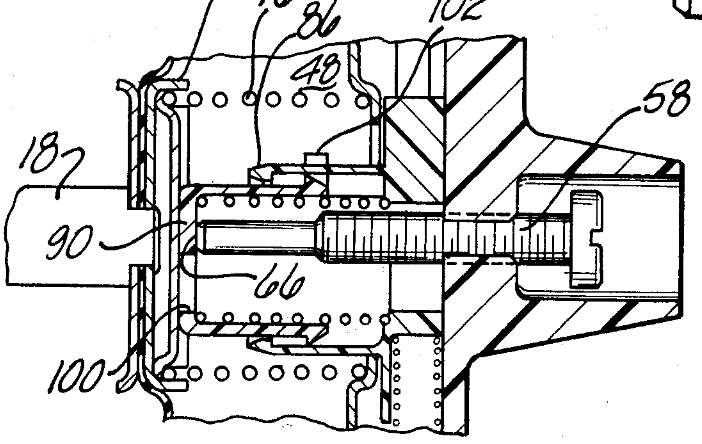
FIG. 3 is a cross-sectional view of a portion of the arrangement seen in FIG. 2 showing another condition of operation.

Referring to FIG. 2, the various parts are shown in the positions that they would occupy when the internal combustion engine is not operating at which time the solenoid 96 would be deenergized and atmospheric pressure would exist in the constant pressure chamber 46 and in the variable pressure chamber 48. Upon energizing the solenoid 96, for example by closing the ignition switch of a vehicle, the solenoid plunger 104 moves the shuttle mechanism 60 against the biasing action of the transverse spring 94 to the position shown in FIG. 3. This serves to displace the opening 100 to one side of the axis of the motor 10 and out of alignment with the adjusting screw 58 and plunger assembly 18. Upon starting of the internal combustion engine vacuum pressure becomes available in the intake manifold 52 and in the variable pressure chamber 48. Because of atmospheric pressure in chamber 46 a differential pressure is formed across the diaphragm assembly 34 causing it to move to the right against the biasing action of the return spring 76. The diaphragm assembly 34 first engages the cap 86 so that it moves to the right, and the wall 90 is moved into engagement with the end 66 of the adjusting screw as seen in FIG. 3 which limits any further movement of the diaphragm assembly 34.

During movement of the diaphragm assembly 32 the plunger assembly 18 is moved to rotate the choke 24 toward an open position, the amount of opening being dependent on the length of stroke of the plunger assembly 18. The two factors controlling the length of stroke are the position of the adjusting screw 58 and the thickness of the wall 90 of the cap 86.

When the engine is turned off atmospheric pressure is reestablished in the chambers 46 and 48, and the diaphragm assembly 34 returns to its original position as illustrated in FIG. 2. Also the cap 86 returns to its original position with the flange 84 in engagement with the hook elements 82 and the entire shuttle mechanism 60 returns to its original position with the opening 100 in alignment with the adjusting screw 58.

If the engine is started without energizing the solenoid 96, the shuttle mechanism 60 will remain in the position illustrated and movement of the diaphragm assembly 34 to the right will cause the cap 86 to be telescoped within the fingers 78. Since the opening 100 has remained in alignment with the adjusting screw 58, the end 66 comes into direct engagement with the plate 68. This results in an increase in the length of stroke of the plunger assembly 18 an amount equal to the thickness of the wall 90. Consequently, the choke 24 is open a larger amount than when the solenoid is energized and the fuel air mixture is leaner.

The motor control 10 is intended for operation such that the solenoid 96 which forms a control means is energized each time the engine is operated during the first predetermined number of hours of engine operation or vehicle miles. For example, the predetermined period of miles might be 28,000 miles. Up until that period of operating time the solenoid 96 will move the shuttle assembly 60 each time the engine is started and will permit it to return to its original position each time the engine is turned off. Also, the cap 86 is telescoped within the fingers 78 each time the diaphragm assembly 34 moves to its control position to open the choke 24. After the predetermined number of miles is achieved, the operation of the solenoid 96 can be permanently terminated by way of a switch 110 between solenoid 96 and a power source 112 to maintain the stroke modifying means provided by shuttle 60 in the position seen in FIG. 2. Thereafter, movement of the diaphragm assembly 34 continues to telescope the cap 86 but the hole 100 is in alignment with the end 66 of the adjusting screw 58 so that the length of stroke of the plunger assembly 18 is for the additional amount as defined by the thickness of wall 90 on cap 86. The result is that after a predetermined number of miles, the choke 24 is moved to a more open position to afford a leaner fuel to air mixture to thereby reduce engine emissions.

The embodiments of the invention in which an exclusive property or privilege is claimed are defined as follows:

1. A vacuum motor for controling a carburetor choke valve comprising:

a housing, a movable wall forming a control chamber in said housing at one side of said movable wall, an output member connected to the other side of said movable wall and to a carburetor choke valve, said wall being movable in response to vacuum pressure in said control chamber to move said output member and choke valve toward an open position, stop means formed in said housing and being engageable with said wall to limit movement of said wall and determine the length of stroke of said output member, stroke modifying means movable to a first position between said stop means and said wall to limit movement of said wall to a first predetermined position, said stroke modifying means being movable transversely of the direction of movement of said movable wall between said first position and a second position in which said stroke modifying means is disposed to one side of said stop means, means biasing said stroke modifying means toward said second position, and control means operable to maintain said stroke modifying means in said second position to permit movement of said movable wall to a second predetermined position to move said choke valve to a more fully open position.

2. The combination of claim 1 wherein said stop means is adjustable to determine the location of said wall in its first and second predetermined positions.

3. The combination of claim 1 and further comprising means to terminate operation of said control means after a predetermined length of operation of said vacuum motor.

4. A vacuum motor for controlling a carburetor choke valve comprising; a housing, a movable wall forming a control chamber in said housing at one side of said movable wall an output member connected to the other side of said movable wall and to a carburetor choke valve, said wall being movable in response to vacuum pressure in said control chamber to move said output member and choke valve toward an open position, stop means formed in said housing and engageable with said wall to limit movement of said wall and determine the length of stroke of said output member, stroke modifying means movable to a first position between said stop means and said wall to limit movement of said wall to a first predetermined position, in the form of an electric servomoter selectively operable to move said stroke modifying means, and control means operable to maintain said stroke modifying means in a second position to permit movement of said movable wall to a second predetermined position to move said choke valve to a more fully open position.

5. The combination of claim 4 wherein said electric servomotor is a solenoid and wherein said solenoid is energized to move said stop means to said first predetermined position and is de-energized to permit movement of said stroke modifying means to said second predetermined position.

6. A vacuum motor for controlling a carburetor choke valve comprising; a housing, a movable wall forming a control chamber in said housing at one side of said movable wall, an output member connected to the other side of said movable wall and to a carburetor choke valve, said wall being movable in response to vacuum pressure in said control chamber to move said output member and choke valve toward an open position, stop means formed in said housing and engageable with said wall to limit movement of said wall and determine the length of stroke of said output member, stroke modifying means movable to a first position between said stop means and said wall to limit movement of said wall to a first predetermined position, said stroke modifying means including a stroke limiting member and a support member, said stroke modifying member being movable by said wall relative to said support member into engagement with said stop means when said stroke modifying means is in its first position and control means operable to maintain said stroke modifying means in a second position to permit movement of said movable wall to a second predetermined position to move said choke valve to a more fully open position.

7. The combination of claim 6 wherein said stroke limiting member is telescopically supported by said support member.

8. The combination of claim 7 wherein said support member includes hook elements and wherein said stroke limiting member has a flange engageable with said hook elements to limit spaced apart movement.

9. The combination of claim 8 and further comprising means biasing said stroke limiting member and support member to its said spaced apart relationship.

* * * * *

UNITED STATES PATENT AND TRADEMARK OFFICE
CERTIFICATE OF CORRECTION

PATENT NO. : 4,284,261

DATED : August 18, 1981

INVENTOR(S) : Benjamin C. Benjamin and Charles A. Detweiler

It is certified that error appears in the above—identified patent and that said Letters Patent is hereby corrected as shown below:

Column 5, line 26, "servomoter" should read --servomotor--

Signed and Sealed this

*Twenty-third* Day of *March 1982*

[SEAL]

*Attest:*

GERALD J. MOSSINGHOFF

*Attesting Officer* *Commissioner of Patents and Trademarks*